UNITED STATES PATENT OFFICE 2,575,122

PIPERAZINE COMPOUNDS

Cash B. Pollard and Thomas H. Wicker, Gainesville, Fla., assignors to Parke, Davis & Company, Detroit, Mich., a corporation of Michigan No Drawing. Application October 11, 1950, Serial No. 189,670

6 Claims. (Cl. 260—268)

This invention relates to heterocyclic nitrogen compounds and to methods for obtaining the same. More particularly, the invention relates to N-phenyl-N'-(2-hydroxy-3-alkoxypropyl)piperazine compounds having the formula,

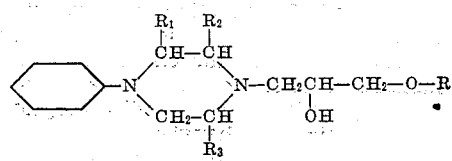

and acid addition salts of the same; where R is $-CH_3$ or $-C_2H_5$ and $R_1$, $R_2$ and $R_3$ are the same or different and represent hydrogen or methyl groups.

In accordance with the invention, piperazine compounds having the above formula can be produced by several methods. The first of these methods involves the reaction of an N-phenylpiperazine compound of formula,

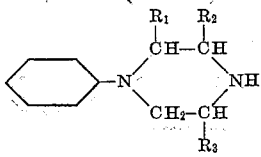

with a 1,2-epoxy-3-alkoxypropane of formula,

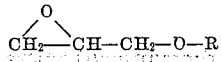

where R, $R_1$, $R_2$, and $R_3$ have the same significance as given above. The reaction is preferably carried out in the presence of a small amount of water which appears to function as a catalyst. The temperature is not particularly critical and can be varied from room temperature (about 25° C.) to about 150° C. If desired, a solvent such as methanol, ethanol, isopropanol, benzene, chloroform and the like can be used but it is not necessary.

A variation of the above-described process involves reacting a 1,2-epoxy-3-halopropane with the N-phenylpiperazine compound to produce an N-phenyl-N'-(2-hydroxy-3-halopropyl)piperazine compound of formula,

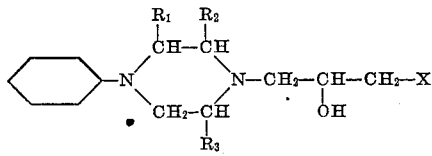

where X is a halogen atom and $R_1$, $R_2$ and $R_3$ have the same significance as given above. The N-phenyl-N'-(2-hydroxy-3-halopropyl)piperazine compound is then converted to the corresponding N-phenyl-N'-(2-hydroxy-3-alkoxypropyl)piperazine compound by reaction with an alkali metal methoxide or ethoxide. The latter reaction is carried out by warming or allowing the reactants to stand together in an anhydrous, organic solvent such as methanol or ethanol.

The products of the invention can also be produced by the reaction of an N-phenylpiperazine compound of formula,

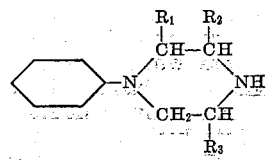

with a 1-halo-2-hydroxy-3-alkoxypropane of formula,

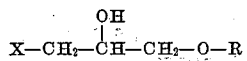

where X is a halogen atom and R, $R_1$, $R_2$ and $R_3$ have the same significance as given above. The reaction is preferably carried out in an inert organic solvent such as methanol, ethanol, isopropanol, benzene, xylene, chloroform, carbon tetrachloride and the like. From the standpoint of economy, it is also preferable to carry out the reaction in the presence of an alkaline catalyst such as an alkali metal or alkaline earth metal, carbonate, bicarbonate or hydroxide. If no catalyst is employed, two equivalents of the N-phenylpiperazine compound are required for each equivalent of the 1-halo-2-hydroxy-3-alkoxypropane because one equivalent of the N-phenylpiperazine compound reacts with the halopropane compound while the other reacts with the hydrogen halide liberated by the reaction to form the hydrogen halide salt of the N-phenylpiperazine compound.

The compounds of the invention form normal salts with both inorganic and organic acids. Some examples of such salts are the hydrochloride, hydrobromide, sulfate, acetate, citrate and the like. The N-phenyl-N'-(2-hydroxy-3-alkoxypropyl)piperazine compounds posess a high degree of sympatholytic activity and a significant degree of antihistamine activity. They may be used for therapeutic purposes either in the free base or acid addition form. They can be administered by either the oral or parenteral routes.

The invention is illustrated by the following examples.

Example 1.—N-phenyl-N'-(2-hydroxy-3-methoxypropyl) piperazine

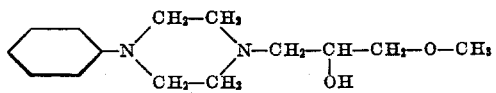

(a) 17.6 g. of 1,2-epoxy-3-methoxypropane is added dropwise to a mixture composed of 32.4 g. of N-phenylpiperazine and 1 cc. of water at 75° C. During the addition, which requires about ten minutes, the temperature of the reaction mixture rises to approximately 125° C. The temperature is maintained at 125–30° C. for one hour and the mixture allowed to cool. The crystalline mass is recrystallized from boiling heptane using activated carbon to remove any colored impurities. The white crystalline N-phenyl-N'-(2-hydroxy-3-methoxypropyl) piperazine so obtained melts at 62.5–63.5° C. (corr.).

3 g. of N-phenyl-N'-(2-hydroxy-3-methoxypropyl) piperazine is dissolved in dry ether and the calculated quantity of hydrogen chloride dissolved in dry isopropanol is added. The white precipitate is collected and purified by recrystallization from isopropanol. The hydrochloride salt of N-phenyl-N'-(2-hydroxy-3-methoxypropyl) piperazine so obtained melts at 190–205° C., with decomposition.

(b) 21.7 g. of 1-chloro-2-hydroxy-3-methoxypropane is added dropwise during a period of about twenty minutes to a mixture of 32.4 g. of N-phenylpiperazine and 21.2 g. of anhydrous sodium carbonate which has been heated ten minutes on the steam bath. The resulting mixture is then heated three hours on the steam bath, poured into boiling heptane, and allowed to crystallize. The resulting crystalline mass is recrystallized from boiling heptane using activated carbon to remove any colored impurities. The product so obtained is identical in all respects to that obtained by the procedure described in (a) above.

Example 2.—N-phenyl-N'-(2-hydroxy-3-ethoxypropyl) piperazine

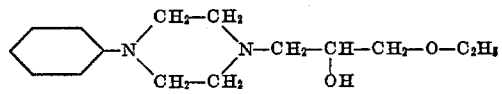

20.4 g. of 1,2-epoxy-3-ethoxypropane is added to 32.4 g. of N-phenylpiperazine at about 150° C. The temperature climbs to 210° C. during addition, but the reaction mixture is allowed to cool to 175° C. and is maintained at that temperature for six hours. The mixture is then allowed to crystallize and is recrystallized from boiling heptane using activated charcoal to remove colored impurities. The white crystalline N-phenyl-N'-(2-hydroxy-3-ethoxypropyl) piperazine so obtained melts at 61.5–62.7° C. (corr.).

Example 3.—1-phenyl-3,5-dimethyl-4-(2-hydroxy-3-methoxypropyl) piperazine

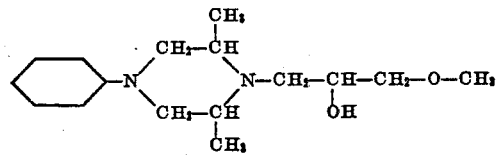

8.8 g. of 1,2-epoxy-3-methoxypropane is added dropwise to a mixture composed of 9.5 g. of 1-phenyl-3,5-dimethylpiperazine and 0.5 cc. of water. During the addition the temperature is maintained at 80–100° C. The reaction mixture is heated for one hour after the addition has been completed and then cooled. The crystalline product is taken up in and recrystallized from boiling heptane to obtain the desired 1-phenyl-3,5-dimethyl-4-(2-hydroxy-3-methoxypropyl)-piperazine as a white crystalline solid.

Example 4.—1-phenyl-2,5-dimethyl-4-(2-hydroxy-3-methoxypropyl) piperazine

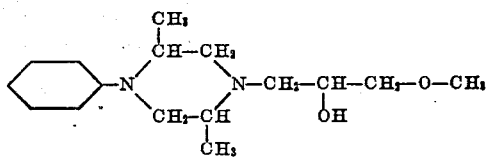

11.8 g. of 1,2-epoxy-3-methoxypropane is added dropwise to a mixture composed of 12.6 g. of 1-phenyl-2,5-dimethylpiperazine and 0.5 cc. of water at about 80° C. During the addition the temperature of the reaction mixture rises to approximately 120° C. The temperature is maintained at 120° C. for one hour and then the mixture allowed to cool. The crystalline mass is recrystallized from boiling heptane to obtain the desired 1-phenyl-2,5-dimethyl-4-(2-hydroxy-3-methoxypropyl) piperazine in pure form.

What we claim is:

1. A compound of the class consisting of a free base and its acid addition salts, said free base having the formula,

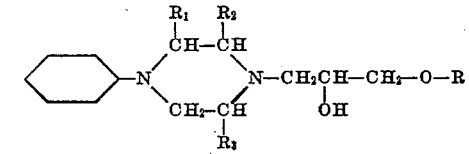

where R is a member of the class consisting of —$CH_3$ and —$C_2H_5$ and $R_1$, $R_2$ and $R_3$ are members of the class consisting of hydrogen and methyl groups.

2. N-phenyl-N'-(2-hydroxy-3-methoxypropyl) piperazine.

3. The hydrochloride salt of N-phenyl-N'-(2-hydroxy-3-methoxypropyl) piperazine.

4. N-phenyl-N'-(2-hydroxy-3-ethoxypropyl)-piperazine.

5. 1-phenyl-3,5-dimethyl-4-(2-hydroxy-3-methoxypropyl) piperazine.

6. 1-phenyl-2,5-dimethyl-4-(2-hydroxy-3-methoxypropyl) piperazine.

CASH B. POLLARD.
THOMAS H. WICKER.

No references cited.